United States Patent [19]

Choquet

[11] 4,330,858
[45] May 18, 1982

[54] TIME DOMAIN SUPERVISORY CHANNEL FOR DATA TERMINAL EQUIPMENTS

[75] Inventor: Michel F. Choquet, Saint Donat, France

[73] Assignee: International Business Machines Corporation, Armonk, N.Y.

[21] Appl. No.: 53,487

[22] Filed: Jun. 29, 1979

[51] Int. Cl.³ .............................................. H04J 3/12
[52] U.S. Cl. .................................................... 370/111
[58] Field of Search .......................... 370/111, 110, 80; 179/2 DP

[56] References Cited

U.S. PATENT DOCUMENTS

| | | | |
|---|---|---|---|
| 2,974,281 | 3/1961 | Feldman | 370/111 |
| 3,303,285 | 2/1967 | Brown | 370/111 |
| 3,304,372 | 2/1967 | Filipowsky et al. | 370/111 |
| 3,310,631 | 3/1967 | Brown | 370/111 |

*Primary Examiner*—Douglas W. Olms
*Attorney, Agent, or Firm*—Charles P. Boberg; Roy R. Schlemmer, Jr.

[57] ABSTRACT

Digital data communication system uses a common channel to carry both normal messages and supervisory messages, the latter being inserted into the message stream during intervals between normal messages. Each transmitting location has a switch or equivalent controller with three settings. Setting 1 enables data to pass from the normal message generator directly to the channel. Setting 2 enables data to pass indirectly from the normal message generator through a delay line to the channel. Setting 3 enables data to pass from the supervisory message generator to the channel. Message status means associated with the delay line enables the switch to assume setting 3 when no normal message is being generated and a supervisory message is awaiting transmission. When the supervisory message ends, the switch may assume setting 1 if the delay line contains no significant normal message data nor any indication that an out-of-synchronism condition exists; otherwise the switch assumes setting 2 until the delay line is cleared of normal message data or reaches a synchronous state, as the case may be, whereupon it returns to setting 1. Each supervisory message has a distinctive format which enables it to be recognized at the receiving location and diverted from the message stream to a supervisory message receiver before it can enter the normal message receiver.

11 Claims, 11 Drawing Figures

SUPERVISORY MESSAGE INSERTION

SUPERVISORY MESSAGE FORMAT

F = FLAG
F* = INSERTED FLAG
A = ADDRESS BYTE
C = CONTROL BYTE
X = ANY BIT
S/D = SUPERVISORY DATA

SUPERVISORY MESSAGE INSERTION

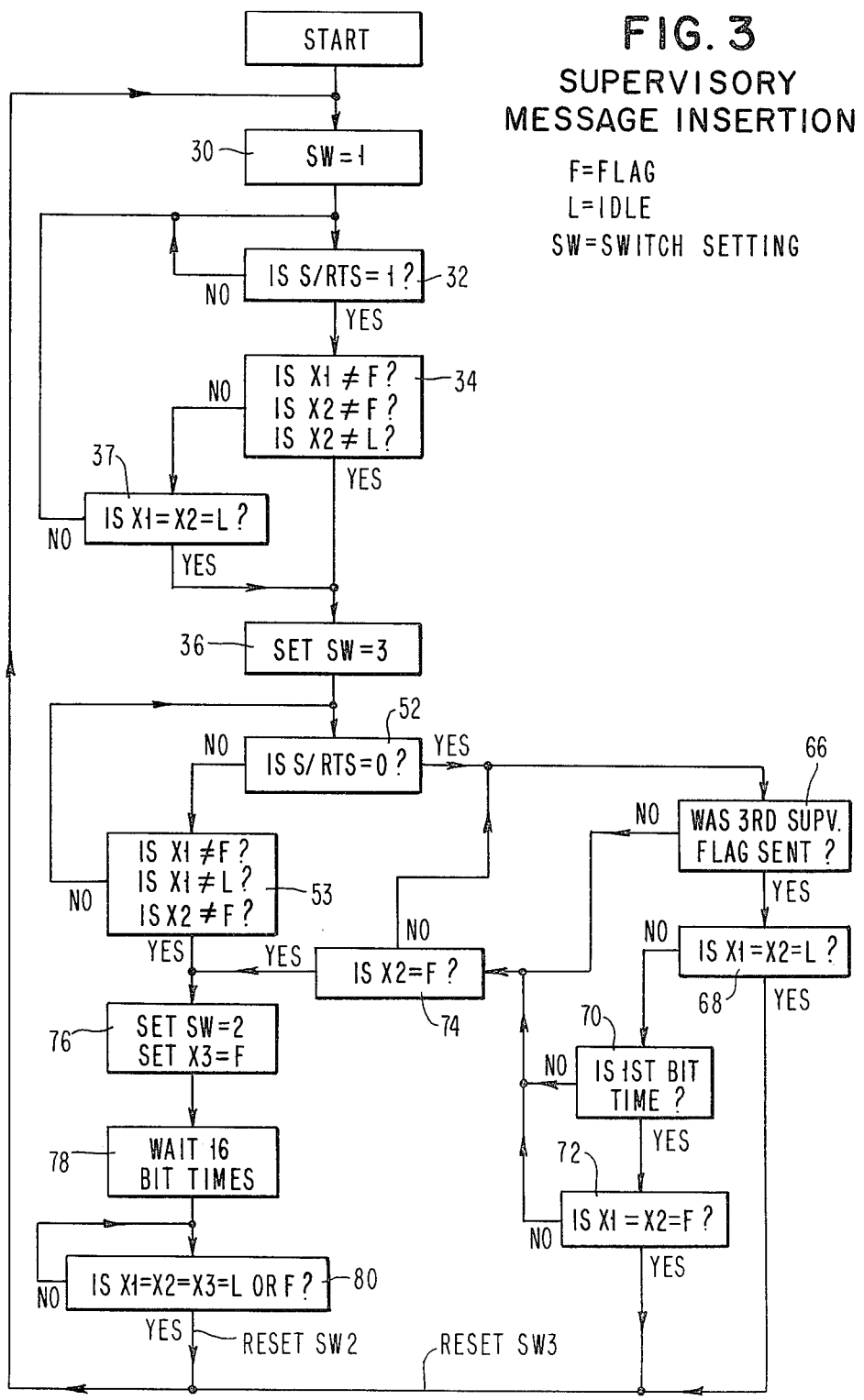

FIG. 4A
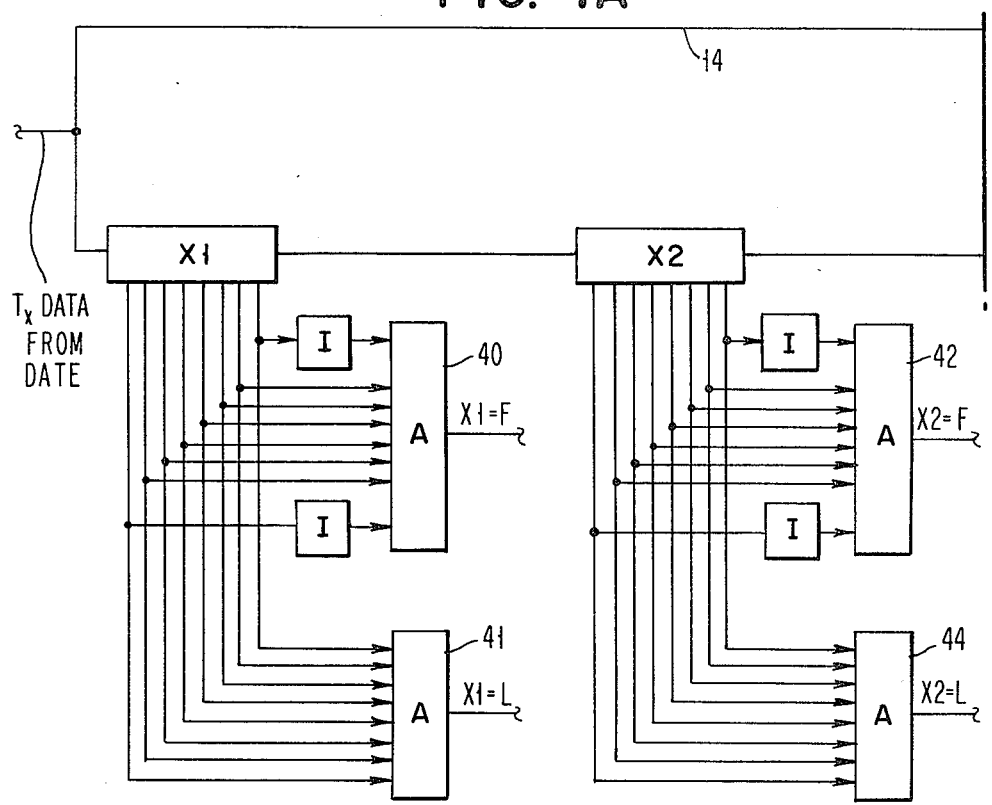
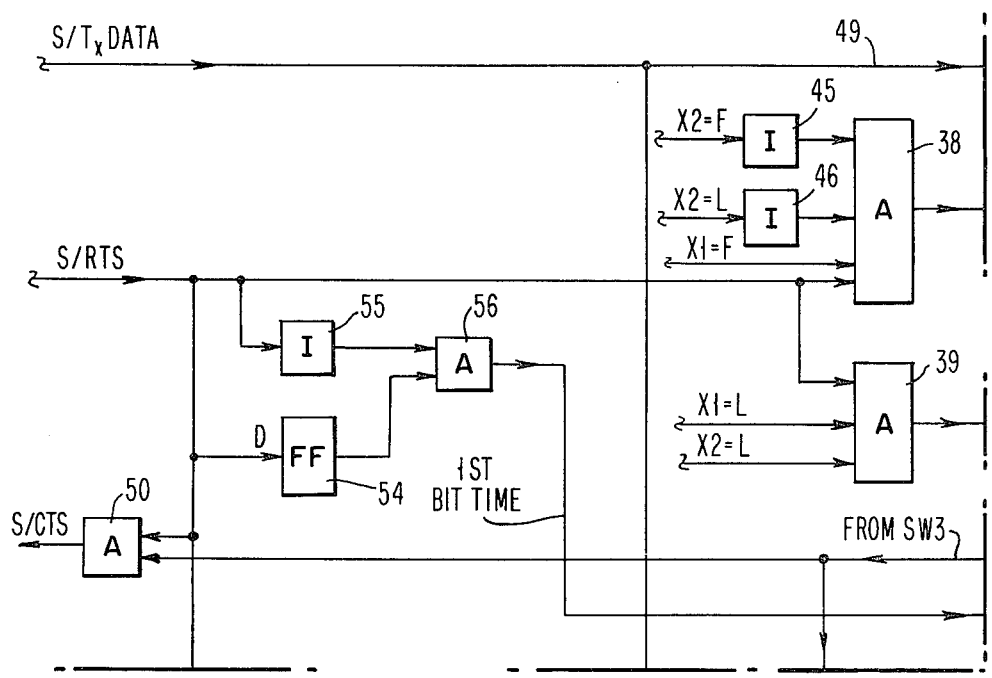

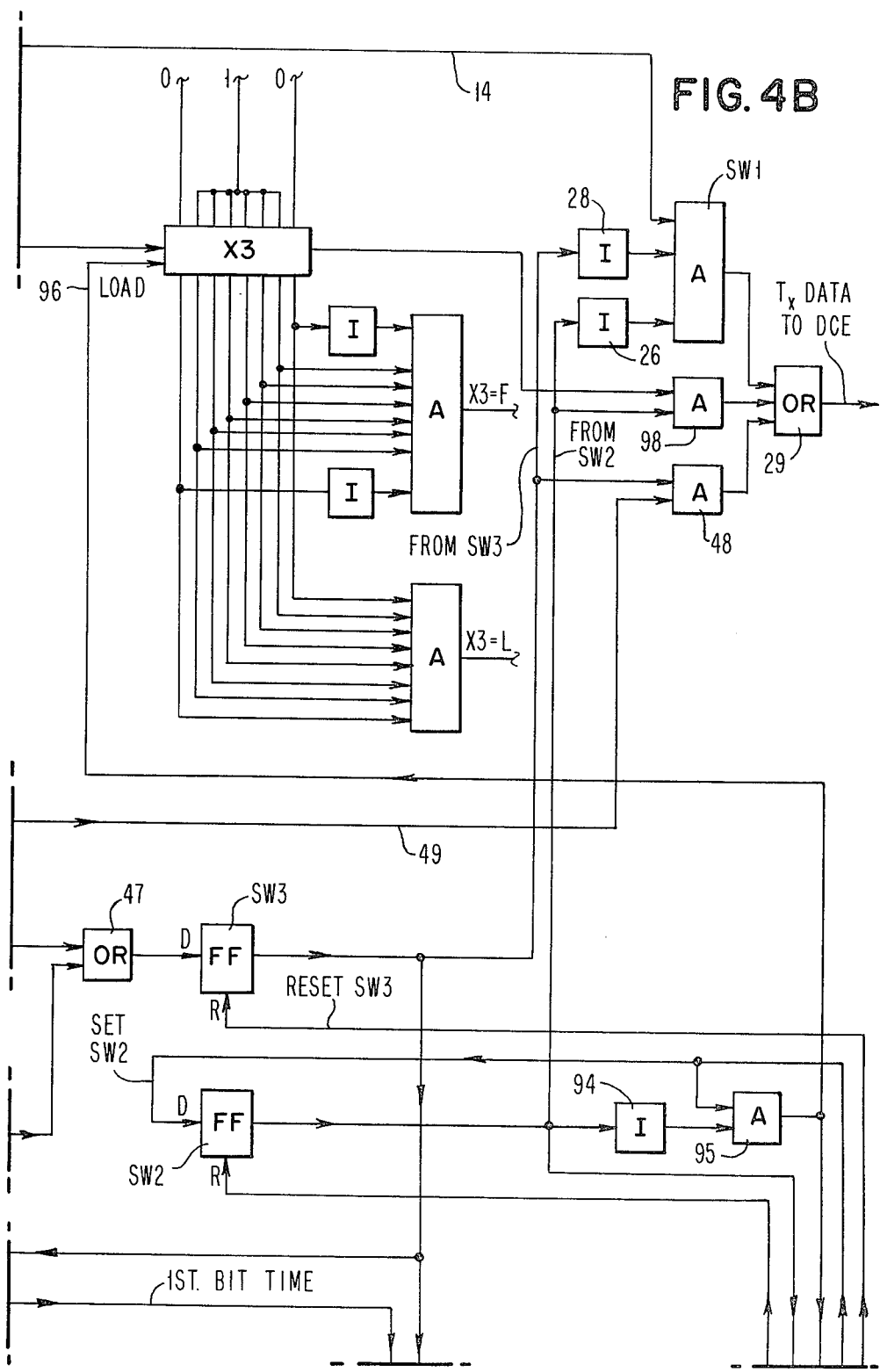

| FIG. 4A | FIG. 4B |
|---|---|
| FIG. 4C | FIG. 4D |

A = AND
I = INVERTER
F = FLAG (01111110)
L = IDLE (11111111)
FF = FLIP-FLOP
SW = SWITCH SETTING

X1, X2, X3, X4, X6, X7 } 8-BIT SHIFT REGISTER

X5 = 4-BIT SHIFT REGISTER
X8 = 16-BIT SHIFT REGISTER

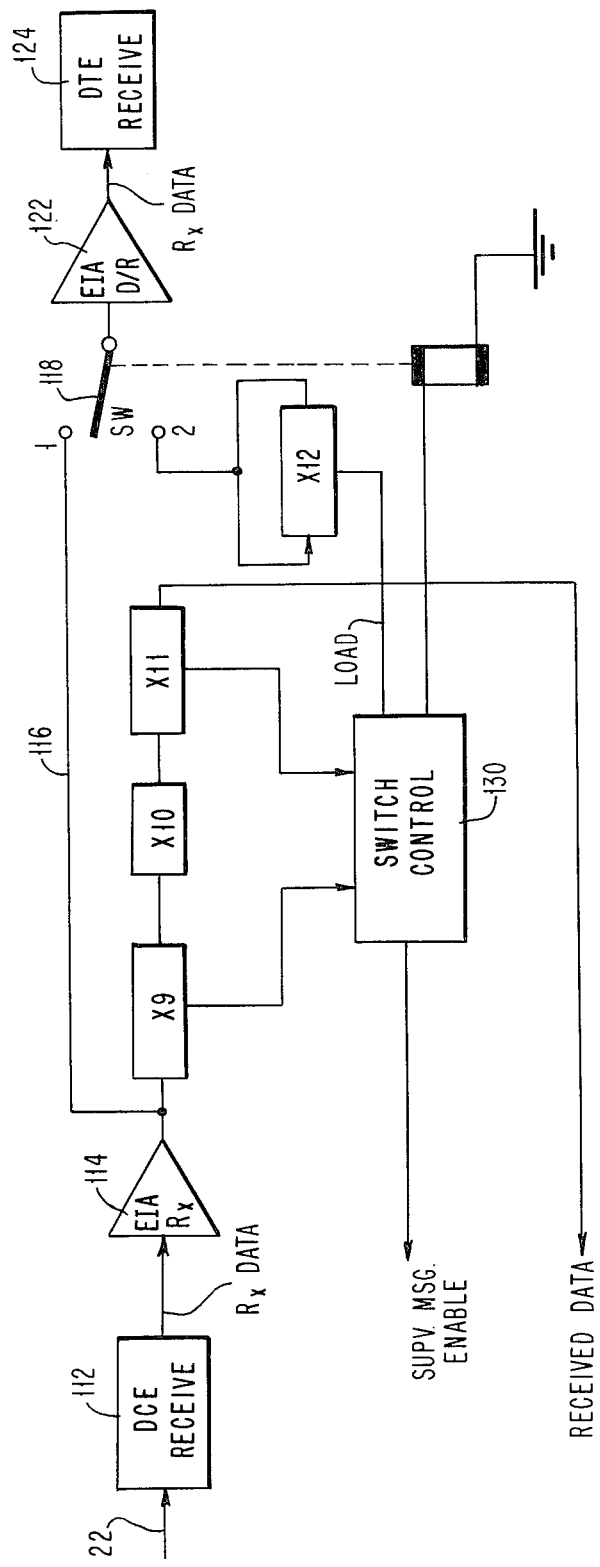

SUPERVISORY MESSAGE REMOVAL

TIME DOMAIN SUPERVISORY CHANNEL FOR DATA TERMINAL EQUIPMENTS

BACKGROUND OF THE INVENTION

This invention relates to digital data communication systems, teleprocessing networks and the like, and in particular it relates to multiplexing schemes for introducing supervisory messages into data streams containing normal message transmissions.

As used herein, the term "supervisory message" applies broadly to any information which is utilized for monitoring and/or controlling the operations of equipments in a communication system, as distinguished from information which is utilized for normal data processing purposes without regard to the manner in which the communication equipment is functioning or malfunctioning. Supervisory messages commonly include diagnostic information sent from remote equipments to a central station and commands sent from the central station to the remote equipments in response thereto.

The term "digital" is used herein to denote information which is communicated in the form of discrete pulses, and it includes digitized analog signals as well as coded binary data.

It has been found costly and otherwise undesirable to provide special modems or special separate communication channels for handling supervisory messages. It is preferable that supervisory messages be communicated by facilities which are no more expensive and require no greater frequency bandwidth than the facilities that otherwise would be needed to handle normal message traffic in the complete absence of any supervisory messages. One way to accomplish this objective is to employ time division multiplexing whereby the time during which a communication channel is used will be divided between time intervals wherein normal messages may be sent and other time intervals that are utilized only for supervisory messages. Since the normal messages rarely use 100 percent of the time available, supervisory messages may be inserted whenever interruptions in the normal message transmissions occur. This practice does not expand the bandwidth of the communication channel nor does it affect the complexity of the normal communication protocols by the act of accommodating the supervisory messages.

In one form of time division multiplexing that has been proposed heretofore, certain regularly occurring time slices or digit spaces are reserved exclusively for the digits of supervisory messages, regardless of whether or not there are any supervisory messages to be transmitted. This practice of allocating predetermined fixed time slices to supervisory messages can be wasteful when little or no supervisory data is to be sent, and insufficient when a great deal of it is to be sent. It is just as desirable to use time economically as it is to minimize the cost of the equipment which is being used. Supervisory messages are likely to occur in random fashion at unpredictable times, not at regular intervals, and it would be inefficient to reserve regularly occurring time intervals for handling such messages, because often these intervals would not be utilized for any useful purpose. Furthermore, it is not usually necessary for the supervisory messages to preempt the channel immediately. In most, if not all, instances they can await the inevitable gaps in the normal message flow.

SUMMARY OF THE INVENTION

It is an object of the present invention to enable supervisory messages to be communicated in a manner that will fulfill all of the requirements stated above. Specifically, it is an object to provide a supervisory channel of the aforesaid type in which time domains are allocated to supervisory messages only when such messages occur and in a manner that does not interfere with normal message transmission.

These objectives are realized in the system herein disclosed, which takes advantage of the fact that during normal message transmission there are idle periods or gaps which occur at random but not infrequent times, and such idle periods may be utilized for communicating supervisory messages, if any, without reducing or interfering with the normal message throughput. The invention provides a novel interface between the data terminal equipment (DTE) and the data communicating equipment (DCE), also referred to herein as a modem, whereby a gap in the normal message transmission from the DTE is detected and made available to the supervisory equipment so that it can transmit through the DCE any supervisory message that may be awaiting transmission to the central station or to another terminal. If a supervisory message is received back through the DCE from the addressed location, it can be intercepted and routed by the interface to the supervisory equipment without passing through the DTE. Thus, the DTE at each end is unaware of the passage of supervisory data so that no DTE action is required. The technique disclosed herein can even be retrofitted to existing systems without affecting the DTE's therein.

The detection of a gap in normal message transmission may be accomplished in any convenient way according to the particular environment in which the invention is being used. For example, if synchronous data link control (SDLC) is being utilized for the normal message transmission, the occurrence of a gap between normal messages will be signaled by the transmission of a distinctive eight-bit character pattern called a "flag" following any eight-bit pattern or byte which is neither a flag nor an "idle" character. Under these circumstances the flag denotes the end of a normal message, and it is assumed that a sufficient time interval will elapse before the beginning of the next normal message to permit the insertion of a supervisory message, if one is awaiting transmission at that time. Usually this assumption is correct, and the insertion of the supervisory message therefore commences as soon as the trailing flag of the normal message has been sent. If the assumption is incorrect, and a new normal message is started while the transmission of the supervisory message is still in progress (as signaled by a flag followed by a character which is neither a flag nor an idle), the invention then makes provision for immediately terminating the incomplete supervisory message with a distinctive ending sequence such as a flag so that normal message transmission can be resumed without significant delay.

As can be appreciated from the foregoing brief description, the invention is based upon the concept that supervisory messages will be held for transmission during randomly occurring idle intervals in the normal message transmission, so that the introduction of supervisory messages will not significantly extend the time required for transmitting the normal messages and will not in any significant way interfere with the normal message transmission. This is a substantial improvement over prior time division multiplexing schemes in which significant amounts of time that otherwise could be used for normal message transmission are regularly set aside for the transmission of supervisory messages that do not occur regularly.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a flowchart of the supervisory message insertion process.

FIGS. 4A to 4D, when arranged according to FIG. 4, constitute a more detailed logic diagram of the supervisory message insertion apparatus shown in FIG. 2.

FIG. 5 is a block diagram of an apparatus for withdrawing or removing supervisory messages from the normal message stream at a receiving location, in accordance with the invention.

DETAILED DESCRIPTION

Figure 1:
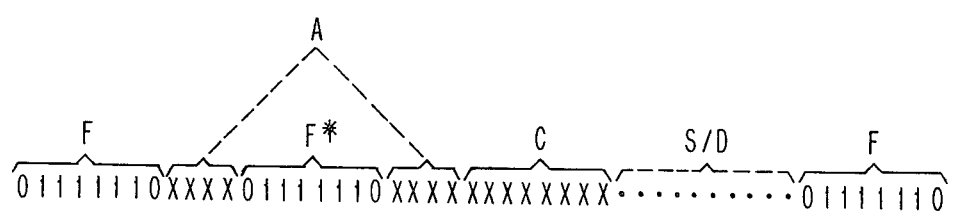
FIG. 1 is a bit sequence rerpresentation showing a preferred supervisory message format that can be conveniently employed in a data communication system embodying the invention.

The invention is disclosed herein as being embodied in a data communication system which utilizes synchronous data link control (SDLC). It should be understood, however, that the invention is not limited to SDLC systems and is capable of being applied to other digital communication systems, such as binary synchronous communication (BSC) systems.

In a system using the SDLC discipline, the normal message format is indicated below:

F A C D FCS F, where
F = Flag = 01111110
A = Address byte
C = Control byte
D = Data field
FCS = Frame check sequence As indicated above, a normal SDLC message commences with a flag (F) and terminates with another flag. Each flag F is an eight-bit byte consisting of an initial 0 followed by six consecutive 1's and a final 0. The initial or leading flag of the message is followed by the address (A) and control (C) bytes, which in turn are followed by a data (D) field that does not have a fixed length but typically contains 100 bits. The frame check sequence (FCS) contains 16 bits (two bytes). It should be noted that even if the message had a data field of zero length, the leading and trailing flags therein still would be separated by four bytes (A byte, C byte and two FCS bytes). Hence, in a normal SDLC message the minimum separation between flags is four bytes (32 bits). Any message that contains two flags separated by a lesser number of bits can readily be recognized as something other than a normal message, presumably a supervisory message.

A gap between normal SDLC messages may be filled with flags F, each represented by a bit string 01111110, or by idle characters L, each represented by a string of eight "1" bits, 11111111. The choice is optional, according to whether the sending terminal is endeavoring to hold the channel or is willing to release it to another terminal in the network.

In a communication system wherein normal messages and supervisory messages may be transmitted in interspersed relationship over a common line or channel, the supervisory messages should have a format which is sufficiently distinct from the normal message format so that these supervisory messages can readily be detected and segregated from the normal messages at an appropriate utilization point in advance of the normal message receiver. On the other hand, the supervisory and normal message formats should not differ so much from each other as to introduce special communication problems which would adversely affect the operation of the conventional data terminal equipment or require a basic redesign of the system. The foregoing requirements can be met by choosing a supervisory message format which resembles a normal message format except that in the supervisory message an extra flag is inserted at a position which is less than four bytes (32 bits) from the leading flag of this message.

In the preferred supervisory message format shown in FIG. 1, an extra flag F* is inserted after the first four bits of the A byte which follows the leading flag F. Thus, the inserted flag F* is separated from the leading flag F by a number of bit positions which is less than four bytes and which moreover is not an integer multiple of a byte. This insures that a supervisory message can readily be identified as such at the receiver, inasmuch as a normal message would have at least four bytes between flags. It also insures that in case of errors on the line, a string of incorrectly transmitted flags will not be confused with the distinctive bit sequence or "header" which marks the beginning of a supervisory message, because it is highly unlikely that two nonadjacent flags in a normal message stream would be separated by a number of bits which is not an integer multiple of a byte, regardless of line errors. It should be understood, of course, that the choice of a four-bit separation between F and F* in FIG. 1 is meant to be exemplary and that other suitable spacings which are not byte integers could be selected as well. The means for generating supervisory messages and other supervisory signals will not be disclosed in detail herein. Such instrumentalities are of conventional design or can readily be adapted therefrom.

In the disclosed system, wherein normal messages are given priority over supervisory messages, a supervisory message may be abruptly terminated before its completion (i.e., before its third flag is generated) if this is necessary in order to clear the channel for a normal message transmission. A supervisory message also may become truncated due to some malfunction of the equipment. In either event the system will automatically provide the truncated supervisory message with a distinctive ending bit sequence in order to demarcate it from a succeeding normal message.

Figure 2:
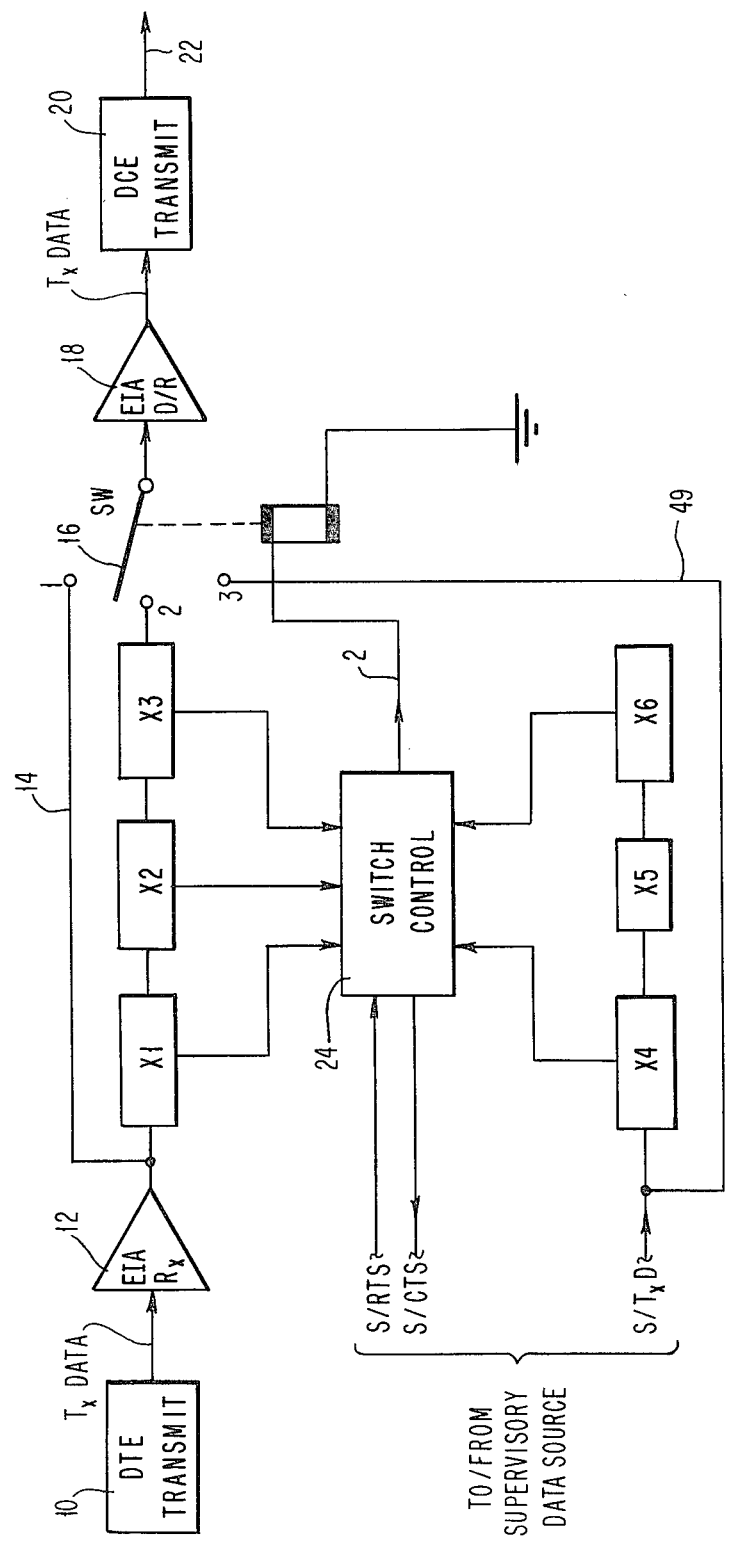
FIG. 2 is a general block diagram of an apparatus designed for use at a transmitting location in a data communication system for inserting supervisory messages into gaps that occur in the normal message stream, according to the invention.

FIG. 2 is a conceptual block diagram which schematically illustrates the principle of supervisory message insertion as contemplated by the invention. The "DTE Transmit" unit 10 is conventional data terminal equipment for generating the normal messages which are to be transmitted. The data to be transmitted from unit 10 ($T_x$ Data) is sent through an Electronic Industries Association standard data receiving (EIA $R_x$) interface 12 to two alternative paths, one of which is a direct connection 14 to position 1 of a three-position switch (SW) unit 16. The other path for the $T_x$ Data extends through a series of three eight-bit shift registers X1, X2 and X3 to position 2 of the switch unit 16. Although the switch 16 is represented for convenience in FIG. 2 as an electromechanical unit, it should be understood that in practice such switching functions are performed by non-moving electronic elements, as described hereinafter. The term "switch position" or "switch setting" therefore should be understood broadly as meaning the electrical connections established by the switch in its current state.

In its position 1, switch 16 passes normal messages ($T_x$ Data) from the DTE interface 12 through an Electronic Industries Association standard driving (EIA D/R) interface 18 to the DCE (data communication equipment) transmitter 20, otherwise known simply as a "modem". As each bit of normal message data passes through conductor 14 to switch position 1, it concurrently is entered also into the first cell of the eight-bit shift register X1, FIG. 2, from whence it progresses through the series of eight-bit shift registers X1, X2 and X3, which together constitute a three-byte delay line. The exit terminal of register X3 is connected to position 2 of switch 16. The functions of registers X1, X2 and X3 will be explained presently. The opertions of these shift registers are timed by clock pulses supplied thereto by a suitable source (not shown).

After passing through switch 16, interface 18 and modem 20, the message is transmitted over the line or channel 22 to the receiving location. The channel 22 is used for communicating both normal messages and supervisory messages. When a supervisory message is being transmitted, switch 16 is in position 3. Supervisory data to be transmitted (S/$T_x$D) passes from a source such as a conventional type of diagnostic card (not shown) through switch position 3, driver interface 18 and modem 20 to the common channel 22.

The setting of switch 16 is controlled by a switch control unit 24, FIG. 2, which normally is in position 1 but may in some instances assume position 2 or 3. Unit 24 may function in response to a supervisory request-to-send (S/RTS) signal, normal message data stored in the delay line X1-X2-X3 and/or supervisory message data stored in a 20-bit delay line comprising two 8-bit shift registers X4 and X6 and an intervening 4-bit shift register X5. In position 1 switch 16 passes normal message data directly from the DTE unit 10 to modem 20. For passing supervisory message data, switch 16 assumes position 3. Occasionally a supervisory message may be ended prematurely as explained hereinabove. In this event, switch 16 changes its setting from 3 to 2, abruptly terminating the supervisory message transmission with a flag generated specially for that purpose and commencing the normal message transmission with information initially contained in the delay line X1-X2-X3. Ultimately switch 16 returns to position 1.

When the setting of switch 16 is changed as described above, a temporary loss of synchronization may occur due to the standard "zero stuffing" procedure which is employed in SDLC encoders. It is customary to insert a "0" after each string of five consecutive 1's that may occur between the final "0" of a leading flag and the first "0" of a trailing flag in a SDLC message. This prevents the inadvertent occurrence of a bit sequence 01111110 which simulates a flag at a place in the transmitted message where no flag was intended. The "stuffed zeros" are disregarded when the received message is decoded. However, their presence in an encoded message tends to complicate the recovery of synchronization after a change of switch setting. In the present system this problem is adequately handled by means described hereinafter.

Reference now is made to FIG. 3, which shows the flowchart for the supervisory message insertion process that is performed by the apparatus shown schematically in FIG. 2. It is optional whether the functions depicted in this flowchart are implemented in software (microprogramming) or are carried out by hardwired logic circuitry such as that shown in FIGS. 4A to 4D. For present purposes it is assumed that the supervisory message insertion procedure is embodied in the circuitry shown, because in practice it is preferable to use hardware rather than software for implementing the switch control functions. However, this does not necessarily imply that in a commercial implementation one must use the specific form of logic circuitry shown herein. For reasons of economy it may be desirable to employ standard chip circuitry, which contains more elements than are actually needed, utilizing only those portions thereof which correspond functionally to the circuitry shown herein.

The switching means represented symbolically in FIG. 2 as a three-position electromechanical switch 16 corresponds to semiconductor switching elements which include gates and flip-flops SW1, SW2, SW3, 48 and 98, FIG. 4B. SW1 is a three-input AND gate, one input to which comes directly from the normal message interface 12 through conductor 14, FIG. 2. The other two inputs to SW1 are supplied through inverters 26 and 28, FIG. 4B, from two flip-flops respectively designated SW2 and SW3. Therefore, gate SW1 can be its "on" state only when both of the flip-flops SW2 and SW3 are in their "off" or "reset" states. When SW1 is in this condition, it functions in the same manner as does switch 16 (FIG. 2) in its No. 1 position, passing normal message data from conductor 14 through OR gate 29, FIG. 4B, to the outgoing message interface 18, FIG. 2.

When the flip-flop SW2, FIG. 4B, is turned on, this corresponds to the condition of switch 16 when it is in its No. 2 setting. Similarly, when flip-flop SW3 is turned on, this has the same effect as placing switch 16 in its No. 3 position. Normally both of the flip-flops SW2 and SW3 are off, and by default this puts gate SW1 in its "on" condition. Only one of the switching elements SW1, SW2 and SW3 may be on at any one time.

Each of the flip-flops designated "FF" in FIGS. 4A-4D is of the edge-triggered type, being turned on at the leading edge of the first clock pulse which is supplied to the flip-flop coincidentally with the application of a "1" input pulse to its data (D) terminal. To avoid unduly complicating the drawing, the clock terminals of the various flip-flops and shift registers and the respective sources of clock pulses thereto are omitted from FIGS. 4A–4D. The flip-flops SW2 and SW3 are self-latching. When either of these flip-flops is turned on, it will remain on until a reset pulse is supplied to its "R" terminal, regardless of any change in the "D" input that may occur during the interim.

Referring again to FIG. 3, a statement such as SW=1, SW=2 or SW=3 in a flowchart box means that the respective switch element SW1, SW2 or SW3, FIG. 4B, is currently in its "on" state. Initially the switch setting is 1, as denoted in box 30, FIG. 3, so that normal message data may pass through the direct connection 14 (FIGS. 2, 4A and 4B) from the DTE to the DCE. As each bit of a normal message stream passes through this connection 14, it also is entered concurrently into the first stage of the shift register X1, from whence it is shifted progressively through the remainder of the delay line afforded by the shift registers X1, X2 and X3. The register X1 holds the most recently generated eight bits of the normal message stream, while the register X2 holds the preceding eight bits thereof.

When the supervisory apparatus is ready to transmit a supervisory message, it raises a supervisory request-to-send (S/RTS) signal. The switch control means is continually testing for the presence of the S/RTS signal, as indicated in flowchart box 32, FIG. 3, and when such a signal is detected, it alerts the system to look for the earliest opportunity to place the supervisory message upon the line without curtailing the current normal message. This is accomplished as follows:

The contents of the registers X1 and X2 are continuously monitored to detect a condition signifying either the end of a normal message, if one currently is being transmitted, or an idle condition of the line or channel if no normal message is being transmitted. In the SDLC procedure the end of a normal message is signaled when register X1 holds a flag byte and register X2 concurrently is storing a byte that is neither a flag nor an idle character (usually the second byte of the frame check sequence FCS). If such a condition is detected at a time when a supervisory request-to-send (S/RTS) signal is being emitted by the supervisory equipment, as denoted by flowchart box 34, FIG. 3, the switch setting is changed from 1 to 3, as shown at flowchart box 36, thereby putting the apparatus of FIG. 2 into a condition to transmit a supervisory message during the time interval which follows the completion of the normal message transmission and prior to the beginning of the next normal message. If the normal message generating means is idle, registers X1 and X2 then store idle (L) characters, and detection of this condition (box 37, FIG. 3) causes the switch setting to change from 1 to 3 (box 36).

In the circuitry of FIG. 4A, the functions depicted by the flowchart boxes 32, 34 and 37 (FIG. 3) are performed by AND gates 38 and 39. One input to each of these gates is the S/RTS signal. Another input to gate 38 is supplied by an AND gate 40 associated with shift register X1. Whenever a flag bit pattern is stored in register X1, the gate 40 supplies a satisfaction signal (X1=F) to the AND gate 38. Another AND gate 41 associated with register X1 furnishes a satisfaction signal (X1=L) to AND gate 39 if X1 is storing an idle character. The AND gates 42 and 44 associated with register X2 are arranged so that gate 42 furnishes a satisfaction signal (X2=F) to an inverter 45 when X2 registers a flag, and gate 44 furnishes a satisfaction signal (X2=L) to inverter 46 and AND gate 39 when X2 registers an idle. If the byte currently registered in X2 is neither a flag nor an idle, then the zero outputs from gates 42 and 44 are inverted by the inverters 45 and 46 and applied as "1" inputs to the AND gate 38. If this occurs at the same time that gate 40 is supplying to gate 38 a flag signal from register X1, and also while a S/RTS signal is being furnished to gate 38 by the supervisory equipment, then gate 38 passes a satisfaction signal through OR gate 47 to the data (D) terminal of flip-flop SW3, FIG. 4B, turning it on. If idle characters are registered in X1 and X2 when S/RTS comes on, gate 39 then passes a signal through OR gate 47 to flip-flop SW3, turning it on.

When SW3 is turned on, it conditions an AND gate 48, FIG. 4B, so that it can pass supervisory message data (S/T$_x$D), when available, from line 49 to the DCE Transmit unit. At the same time, acting through inverter 28, the SW3 signal disables the SW1 gate. The SW3 signal also is applied to an AND gate 50, FIG. 4A. The coincidence of the supervisory request-to-send (S/RTS) signal and the SW3 signal at gate 50 causes the latter to emit a supervisory clear-to-send (S/CTS) signal back to the supervisory equipment, as shown in FIG. 2, thereby initiating transmission of the supervisory message data (S/T$_x$D). Supervisory data now passes from line 49, FIGS. 4A and 4B, through the SW3 gate 48 and OR gate 29 to the driver interface 18, FIG. 2, thence through the DCE Transmit unit or modem 20 to the common channel 22.

Ordinarily one would not expect another normal message to be generated soon after the preceding normal message has ended. Usually there is a sufficient gap between normal messages to permit the transmission of at least one supervisory message, if such a message needs to be transmitted at that time. Supervisory message bits can be transmitted as long as flip-flop SW3 is on (switch position SW=3). Assuming no malfunction the switch remains in position 3 (flip-flop SW3 on) so long as S/RTS=1 and no new normal message has been initiated, as shown by the repetitive loop including the "No" flow lines from the boxes 52 and 53, FIG. 3. The fact that a normal message has commenced will be indicated by the presence of a flag in shift register X2 followed by a byte in register X1 which is neither a flag nor an idle. Usually this does not occur while a supervisory message is being transmitted. In the following portion of the description two situations will be considered—first, the usual case where a supervisory message ends before a new normal message has to be transmitted, and second, the much less frequent case where a supervisory message is still being transmitted at the time when a new normal message is initiated.

A return of the S/RTS signal to zero level is an indication that the supervisory message has been ended. Usually this does not occur until the trailing flag of the supervisory message has been generated. However, it is possible that S/RTS may drop to zero prematurely due to a malfunction. When S/RTS returns to zero, the system must decide whether the switch 16 (FIG. 2) can return immediately from its No. 3 setting to its No. 1 setting or whether it first must assume its intermediate No. 2 setting. The means for making this decision now will be described.

A timing pulse is generated to denote the duration of the first bit clocking time which coincides with the return of S/RTS to zero. In the circuitry of FIG. 4A this function is performed by the combination of flip-flop 54, inverter 55 and AND gate 56. Flip-flop 54 is edge-triggered, but it is not self-latching. It remains on while S/RTS=1, but when S/RTS drops to zero, flip-flop 54 will remain on only for the duration of the current bit period, dropping off at the trailing edge of the current bit clocking pulse. During the short interval while flip-flop 54 is still on, after S/RTS has returned to zero, the AND gate 56 is receiving coincident "1" inputs from flip-flop 54 and the inverter 55, thus enabling gate 56 momentarily to emit a "1ST BIT TIME" signal pulse for the duration of that interval. This information is needed under some conditions, as will be explained.

As mentioned hereinabove, a malfunction could cause the S/RTS signal to drop off prematurely before a complete supervisory message has been transmitted. Under some circumstances this could cause serious problems if no preventive measures were taken. For example, assume that the S/RTS signal falls at an instant when only the first twelve bits FXXXX of the supervisory message (FIG. 1) have been sent and that, by coincidence, the normal message generating means is just then preparing to transmit the first flag of a new normal message after having previously generated a string of idle characters. Ordinarily, when the S/RTS signal goes to zero upon completion of a supervisory message, and the shift registers X1 and X2, FIG. 2, are currently storing idle (L) characters, it could be assumed that the switch setting may change immediately from 3 to 1. In the present case this must not be permitted to occur, however, because the leading flag of the new normal message then would immediately follow the 12-bit sequence FXXXX of the truncated supervisory message, thereby making it appear that the normal message is part of a supervisory message inasmuch as the combined bit strings would then simulate a supervisory message format (FIG. 1).

Another problem of this kind could occur if the S/RTS signal were interrupted just after the leading 20 bits FXXXXF of the supervisory message had been sent and at a time when the delay line X1-X2-X3 is holding a string of flags, the most recent of which (in register X1) is the leading flag of a new normal message. Here again, some action must be taken to prevent the switch setting from being changed immediately from 3 to 1, as otherwise would happen after the termination of a supervisory message if registers X1 and X2 are then storing flags. Otherwise the part of the normal message following the first flag will seem to be that part of a supervisory message which follows the second flag therein. The present system avoids problems of this kind by preventing a change of switch setting directly from 3 to 1 whenever the S/RTS signal drops to zero before the final flag of the supervisory message has been generated.

Figures 4, 4C:
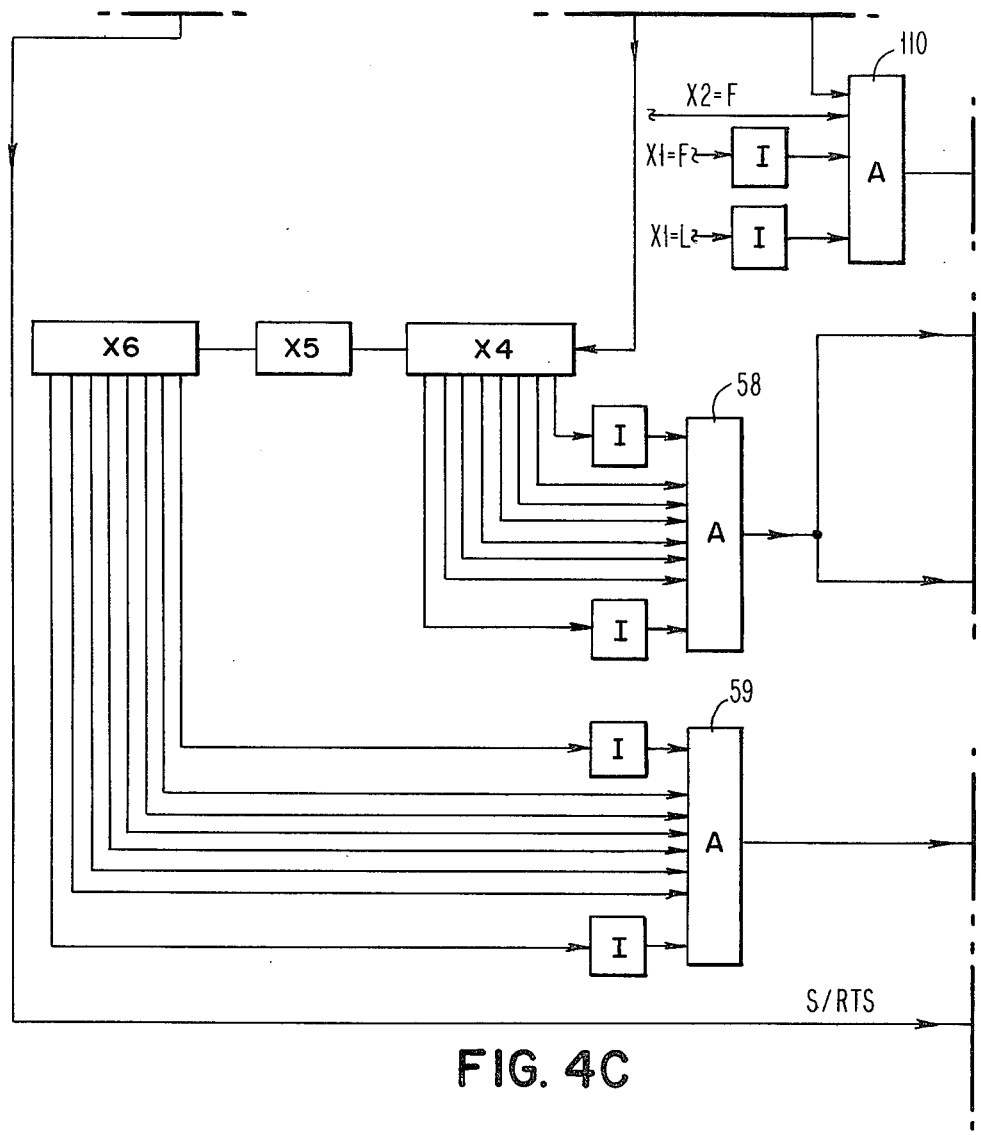

The 20-bit delay line X4-X5-X6, FIGS. 2 and 4C, registers the fact that the header of a new supervisory message is being processed whenever the 8-bit shift registers X4 and X6 are concurrently storing flags. This information is passed through AND gates 58 and 59, FIG. 4C, and the AND gate 60, FIG. 4D, to a flip-flop 61. As flip-flop 61 turns on, it sends a signal through a shift register X7 (which functions as a delay line) to an AND gate 62. Thus, the flip-flop 61, FIG. 4D, remembers that the opening sequence FXXXXF of the supervisory message has been generated and, after a delay interval, supplies this information continuously to AND gate 62. Subsequently, when the trailing flag of the supervisory message has been sent, the shift register X4 momentarily stores a flag bit pattern, which is detected by AND gate 58. This information also is supplied to AND gate 62, which now passes to a flip-flop 64 a signal indicating that the circuitry has detected a bit sequence FXXXXF followed at a later time by a trailing flag F, showing that a supervisory message was both initiated and completed. As flip-flop 64 turns on, it furnishes a reset signal to flip-flop 61 and also produces a "3RD SUPERVISORY FLAG" signal denoting the completion of the supervisory message. The length of the delay line X7 is optional, within limits. In the present embodiment X7 is assumed to be 8 bits in length. Its purpose is merely to insure a time separation between the flg which turns on flip-flop 61 and the flag which turns on flip-flop 64.

Figure 4D:
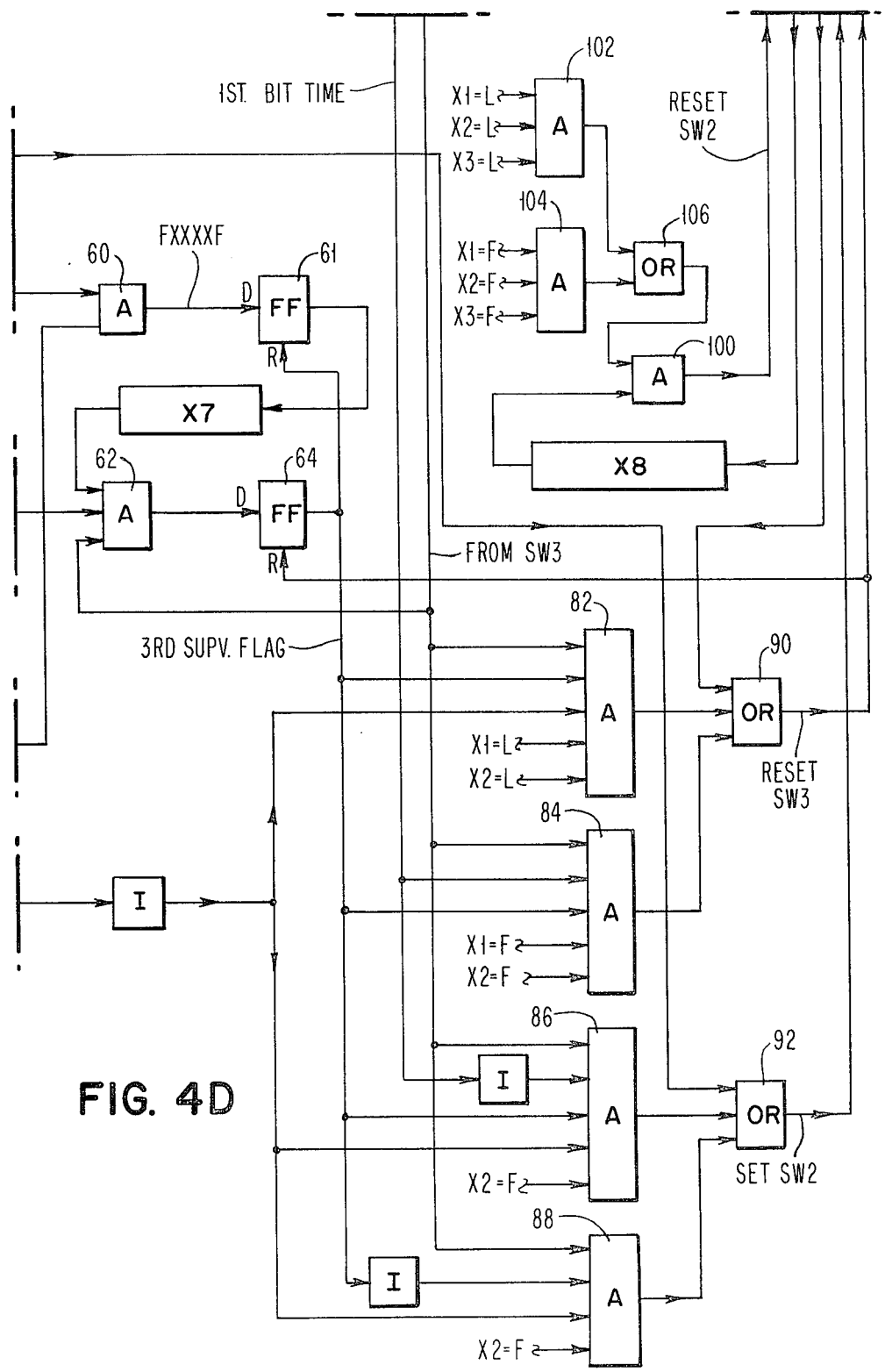

Referring to FIG. 3, a "YES" output from flowchart box 66 denotes that a complete supervisory message has been generated, as evidenced by the presence of a "third supervisory flag" signal from flip-flop 64, FIG. 4D. However, if the message has not yet been completed at the time in question, flip-flop 64 will still be in its off state. Hence, if S/RTS drops to zero (thereby terminating the supervisory message generation) before the trailing flag (that is, the third flag F, FIG. 1) has been generated, then flip-flop 64 will remain off as S/RTS drops to zero. Thereupon the operation will follow the "NO" branch from flowchart box 66. For the time being it will be assumed that the supervisory message has been completed at the time when the S/RTS signal drops to its zero level. Now the system must decide whether the switch setting may change from 3 to 1 immediately or whether it must go first to setting 2 before returning to setting 1.

As shown in flowchart box 68, FIG. 3, it is safe to return the switch 16 (FIG. 2) immediately from setting 3 to setting 1 if the shift registers are storing idles at the time when the supervisory message is completed. This action is represented by the "YES" branch from box 68 and involves resetting the flip-flop SW3, FIG. 4B, thereby enabling the AND gate SW1 so that it again may pass normal message data directly from the DTE to the DCE. Even though registers X1 and X2 are not currently storing idles, however, there is still a chance that the switch setting may be returned to 1 during the first bit time after S/RTS goes down, provided the registers X1 and X2 at that instant are storing flags. Under these conditions the worst that can happen is that the first significant byte (A) of the normal message passes to the DCE immediately after the trailing flag of the supervisory message has passed through the DCE. This is acceptable, because the trailing flag of any message always may serve as the leading flag of a normal message that immediately follows it. (A supervisory message, however, always should have its own leading flag.) Thus, referring to boxes 70 and 72 of FIG. 3, the presence of flags in registers X1 and X2 during the "first bit time" coincident with the return of S/RTS to zero enables the switch to change its setting from 3 to 1 if the third and final flag of a complete supervisory message has just been transmitted.

If neither idles nor flags are present in both of the registers X1 and X2 at the time when S/RTS goes off, then even though the supervisory message is complete, it would be inappropriate to return the switch setting immediately from 3 to 1. This condition indicates that the normal message generator (DTE) may be duly supplying flags to the delay line X1-X2-X3, but these flags are not synchronized with the supervisory message flags. Lack of synchronization between normal message flags and supervisory message flags may result from the "zero stuffing" procedure described above, which prevents the random occurrence of spurious flags but also affects the relative timing of the true flags in a message stream. Loss of synchronization also may result from a premature termination of the supervisory message due to unwanted failure of the S/RTS signal. A sudden return to switch setting 1 under any of these conditions could cause a normal message flag or the byte following it to be truncated, or in some instances it could cause the leading portion of a normal message to become indistinguishable from the trailing portion of a truncated supervisory message.

The disclosed system has been designed with certain safeguards to insure an orderly return to normal message transmission following the termination of a supervisory message under any of the unfavorable circumstances just described. Referring again to FIG. 3, unless the conditions at the time when a supervisory message ends are such as to conform with those represented by the YES branches leading from the flowchart boxes 68, 70 and 72, then the logical procedure advances to a decision node 74, where it remains until a flag is found in register X2.

The appearance of a flag in register X2 marks a byte synchronization time in the normal message generating process. The flag registered in X2 actually was generated one full byte time (eight bit times) ago by the DTE, and it has taken that time to enter register X2 in the delay line X1-X2-X3. The byte which had been generated by the DTE most recently is now in register X1, and it may be another flag or a significant data byte (that is a character other than a flag or idle). At this time it is not known what bit sequence now stands in register X3. It is possible that register X2 now contains the only flag registered in the delay line X1-X2-X3. It is possible also that the supervisory message might have been terminated at a point where two successive flags now must be sent out by the transmitting DCE in order to mark the end of the truncated supervisory message. As a further possibility, a string of from one to seven zero bits might have passed through switch position 3 while the system was waiting for register X2 to acquire a complete flag bit pattern.

In any event, if the conditions are such that the switch 16, FIG. 2, cannot be returned immediately to its setting 1 when the supervisory message transmisson ends, then it is desirable that the switch assume a setting in which it will cause a minimum of two successive flags to be sent to the DCE before a byte of normal message data other than a flag is sent out. This objective is achieved by placing the switch in its setting 2 and forcibly loading the register X3 with a flag bit pattern when the register X2 achieves a flag setting, as indicated by flowchart box 76, FIG. 3. Then, by waiting at least 16 bit times for the bits currently stored in registers X2 and X3 to pass through switch position 2 to the DCE, as shown in box 78, assurance is given that at least two flags will precede the arrival of the first byte of normal message data at the DCE and that these flags will be synchronized with the remainder of the normal message.

The switch remains in its setting 2 until the condition of the delay line X1-X2-X3 indicates that no normal message data is passing through it. When the registers X1, X2 and X3 attain an all-flags or all-idles condition, as indicated in flowchart box 80, then the switch setting is changed from 2 to 1 so that the next normal message (if there is one) may pass directly through switch position 1 to the DCE, bypassing the delay line X1-X2-X3.

The functions depicted in the flowchart boxes 66, 68, 70, 72 and 74, FIG. 3, are performed by the AND gates 82, 84, 86 and 88, FIG. 4D. Each of these AND gates receives among its various inputs an enabling signal from flip-flop SW3, when the switch setting is 3, and a signal from flip-flop 64 (inverted in the case of gate 88) denoting whether or not a third supervisory flag has been detected at the trailing end of the supervisory message. In addition to these inputs, AND gate 82 receives an inverted S/RTS signal when S/RTS=0 and coincident inputs from the AND gates 41 and 44, FIG. 4A, if both registers X1 and X2 contain idles. Fulfillment of these conditions causes AND gate 82 to pass a signal through OR gate 90 for resetting the flip-flop SW3. Since SW2 is off at this time, the resetting of SW3 restores the SW1 gate, FIG. 4B, to its normal conductive state so that it can thereafter pass normal message data, if any, from the DTE to the DCE. This corresponds to the action indicated by the flowchart boxes 68 and 30, FIG. 3. If the conditions for activating AND gate 82 are not fully met, then one of the other AND gates 84, 86 and 88 will be activated.

The AND gate 84, FIG. 4D, performs the functions depicted in flowchart boxes 70 and 72, FIG. 3. This gate can be enabled only during the "first bit time", which is contemporaneous with the return of S/RTS to zero. If at this time the shift registers X1 and X2 are holding flags from the DTE, and the final supervisory flag has just been sent, this means that the final supervisory flag was generated in synchronism with the normal message flags generated by the DTE and that, as yet, no significant normal message data has been generated by the DTE. Under these conditions it is safe to return the switch setting immediately from 3 to 1. Accordingly, the AND gate 84 sends a signal through OR gate 90 to reset the flip-flop SW3, FIG. 4B, which has the effect of restoring the AND gate SW1 to its conductive state (flowchart box 30). The trailing supervisory flag can, if necessary, serve also as the leading flag of a new normal message, if one is not otherwise provided. If the necessary conditions just described are not met, AND gate 84 then cannot be activated to reset SW3, and a different action must be taken.

If the trailing third flag which marks the end of a complete supervisory message has been detected as described above by the time the S/RTS signal drops to zero, but flags or idles are not then present in the shift registers X1 and X2, this indicates that the final supervisory flag was not generated in a synchronously timed relationship with normal message flags. The system now must await the appearance of idles in registers X1 and X2 or a flag in a register X2, whichever occurs first. If idles appear in X1 and X2, the switch then may be reset to 1. If a flag appears in register X2, this could be the leading flag of a new normal message. In this event the switch cannot be returned to setting 1 without losing the significant data that two stands in register X1. Even if register 1 now holds a flag, however, it is too late to return the switch directly from its setting 3 to its setting 1, because the trailing supervisory flag no longer could serve as the leading flag of the new normal message if one were not already provided. The switch now must assume its setting 2.

Consideration now will be given to the AND gate 86, FIG. 4D, which is enabled only after the first bit time has elapsed following the return of S/RTS to zero. Gate 86 performs the function denoted by the "NO" branch from flowchart box 70, FIG. 3, and the "YES" branch from flowchart box 74. No significant action occurs until a flag appears in shift register X2. Then the AND gate 86 passes a signal through an OR gate 92 for setting the flip-flop SW2. As SW2 goes on, several actions occur. First, the combination of an inverter 94 and AND gate 95, FIG. 4B, creates a very short pulse during the brief interval between the instant when a "Set SW2" signal is applied to flip-flop SW3 and the instant when SW3 changes its state in response thereto. This short pulse acts through OR gate 90 to reset the flip-flop SW3. It also is applied momentarily to a flag loading circuit 96 for causing a flag bit pattern to be forcibly entered into shift register X3, FIG. 4B, when circuit 96 is energized. This action places a flag in portion X3 of the delay line X1-X2-X3 immediately preceding the flag that now stands in register X2. As another consequence of activating the flip-flop SW2, an enabling signal is supplied by SW2 to an AND gate 98, FIG. 4B, which corresponds to switch setting 2, while at the same time a disabling signal is applied through inverter 26 to AND gate SW1. Thus, flip-flop SW2 is turned on so that AND gate 98 is now enabled to pass data from the exit end of the delay line X1-X2-X3 to the DCE. The action described above with reference to the flowchart boxes 76, 78 and 80, FIG. 3, now takes place, causing a new normal message, if any, to pass from the DTE through delay line X1-X2-X3 and the "switch setting 2" gate 98 to the DCE.

When flip-flop SW2 was turned on, it also caused an enabling signal to pass through a 16-bit delay line X8, FIG. 4D (corresponding to flowchart box 78, FIG. 3) and be applied to one input terminal of an AND gate 100. Two AND gates 102 and 104 are arranged so that when the current normal message ends, or if there is no normal message, the appearance of an "all-flags" or "all-idles" condition in the shift registers X1, X2 and X3 will apply a signal through an OR gate 106 to the AND gate 100. If this signal is presented to gate 100 more than sixteen bit times after flip-flop SW2 was turned on, gate 100 then passes a reset signal to flip-flop SW2. This corresponds to the action depicted by flowchart boxes 80 and 30. As flip-flop SW2 turns off, it disables the AND gate 98 and restores the AND gate SW1 to its normal conductive state.

In the event that the S/RTS signal returns to zero before the trailing third supervisory flag has been generated, the switch must not be permitted to return immediately from setting 3 to setting 1, for the reasons explained hereinabove. In a worst-case situation, it is possible that the interruption of the supervisory message may occur even before the intermediate flag F* (FIG. 1) has been generated. To insure that the truncated supervisory message will be followed by at least two consecutive flags, the AND gate 88, FIG. 4D, defers action until a flag appears in register X2; whereupon gate 88 then sends a "Set SW2" signal to flip-flop SW2 through OR gate 92. This results in loading a flag into register X3, followed by the transmission of the two flags from X3 and X2 to the DCE (flowchart boxes 76, 78 and 80, FIG. 3).

Thus far it has been assumed that the supervisory request-to-send (S/RTS) signal goes to zero before the DTE starts to generate any significant normal message data (i.e., data other than flags or idles), so that there is no time overlap between the significant leading portion of the new normal message generated by the DTE and the significant trailing portion of the supervisory message generated by the supervisory apparatus. Occasionally, however, the gap between two normal messages may not be sufficient to accommodate a whole supervisory message, and it then becomes necessary to truncate the supervisory message when the new normal message begins. This function (corresponding to the YES branch from flowchart box 53, FIG. 3) is performed by an AND gate 110, FIG. 4C, which receives inputs from flip-flop SW3 and AND gate 42 along with inverted inputs from AND gates 40 and 41, FIG. 4A. The latter three inputs have "1" values whenever shift register X2 holds a flag and shift register X1 holds a byte that is neither a flag nor an idle. Assume that the S/RTS signal is "1" (flowchart box 52) and flip-flop SW3 is on, so that a supervisory message may be passing through switch position 3 (AND gate 48, FIG. 4B) at a time when the DTE starts to generate a new normal message. This new message cannot pass through gate SW1 at this time, but it can enter the delay line X1-X2-X3. When the leading flag of the normal message appears in register X2, followed by the first byte of non-flag message data in register X1, the conditions are met for switching from setting 3 to setting 2 (flip-flop SW3 turned off; flip-floo SW2 turned on, as AND gate 110 produces a "Set SW2" signal). A flag is loaded into register X3, and the two flags in X2 and X3 then pass through switch position 2 (AND gate 98), followed by the first significant byte of the normal message.

Figure 6:
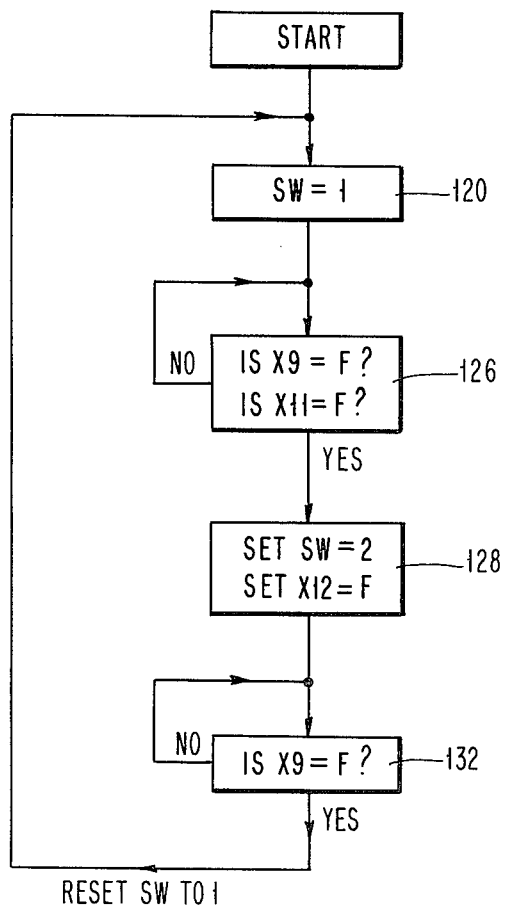
FIG. 6 is a flowchart of the supervisory message removal process.
Figure 7:
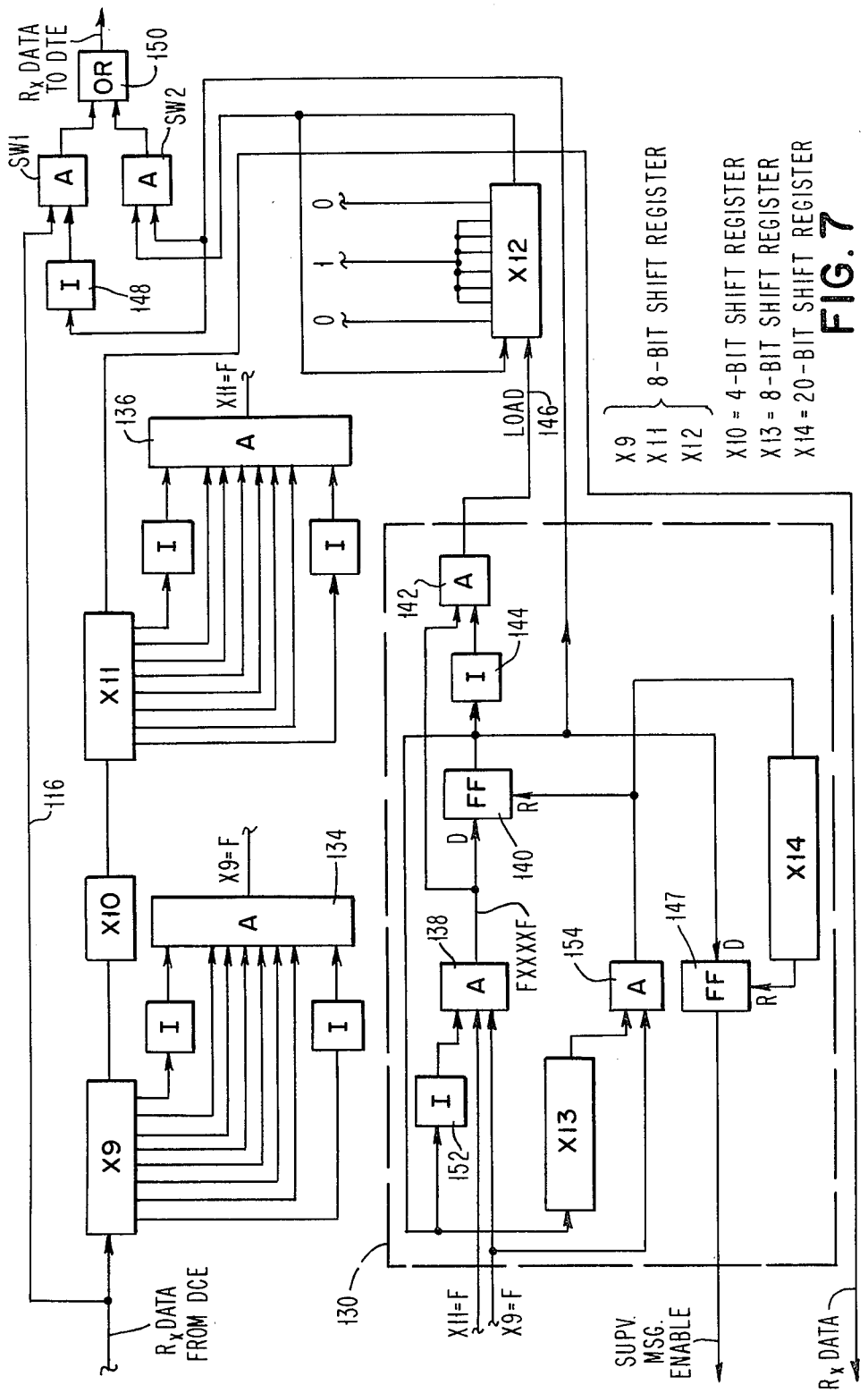
FIG. 7 is a more detailed logic diagram of the supervisory message removal apparatus shown in FIG. 5.

At the message receiving location there is provided a supervisory message removal apparatus as shown in FIGS. 5-7 for withdrawing supervisory messages from the incoming data stream at a utilization point which precedes the data terminal equipment (DTE) to which the incoming normal messages are being directed. The arrangement is such that no significant portion of a received supervisory message is permitted to enter the DTE, and the entire supervisory message is routed to the supervisory equipment (not shown).

It is assumed in the present description that the message removal apparatus of FIGS. 5-7 and the message insertion apparatus of FIGS. 2-4D are at two different locations in a data communication network. In practice, however, each location may have both types of apparatus. It should be understood also that a supervisory message and a normal message may be sent out from a given location on the same channel to different ultimate destinations. Likewise, a given location in the network may receive a normal message and a supervisory message over the same channel from different originating locations. In all of these cases the supervisory message insertion and removal procedures will be substantially as described herein.

At the receiving location it is necessary that an incoming supervisory message be identified as such and removed from channel 22 before any significant part of this message can enter the DTE. FIG 5 schematically illustrates an apparatus for performing that function. As each message, whether normal or supervisory, passes through the receiving data communication equipment (DCE) or modem 112 and thence through the receiving interface 114, it is applied through a conductor 116 to terminal 1 of a two-position switch (SW) unit 118 and also to a delay line comprising a series of shift registers X9, X10 and X11. The registers X9 and X11 each have an eight-bit length, and the intervening register X10 has a four-bit length. Hence, when the header sequence FXXXXF of a supervisory message is present in the delay line X9-X10-X11, flags appear simultaneously in registers X9 and X11. This is a signal for commencing the removal of a supervisory message from the incoming data stream.

FIG. 6 is a flowchart of the supervisory message removal procedure. As denoted by box 120, the switch unit 118 (FIG. 5) normally is in setting 1, where it serves to pass the received message data from the receiving DCE and interface 114 to the driving interface 122 and DTE unit 124. However, when the leading and intermediate flags of a supervisory message concurrently are present in registers X9 and X11, the test for identifying a supervisory message is satisfied, as denoted by the YES branch from the flowchart box 126. As indicated by flowchart box 128, this causes a switch control unit 130, FIG. 5, to change the setting of switch 118 from 1 to 2 and simultaneously load a flag bit pattern into an eight-bit shift register X12, which is connected to form a recirculating data loop. The output of the shift register X12 is applied to the terminal 2 of switch unit 118. As long as this switch setting 2 is maintained, the recirculation loop associated with register X12 will supply consecutive flag bit sequences through switch terminal 2 to the DTE 124. These flags from register X12 replace any bytes that otherwise would have passed from conductor 116 through the switch 118 to the DTE if the switch had remained in its normal position or setting 1.

When the supervisory message header pattern FXXXXF is recognized by switch control unit 130, a "Supervisory Message Enable" signal is sent from unit 130 to the supervisory equipment (not shown). As received data emerges from the exit end of delay line X9-X10-X11, it is sent to the supervisory equipment. When switch 118 assumes its position 2, each byte of data thereafter sent through the delay line X9-X10-X11 to the supervisory equipment is replaced at the DTE receiver by a flag coming from register X12. The leading 20-bit sequence FXXXXF meanwhile will have passed through switch position 1 before the setting was changed to 2. This is of no consequence, however, because the DTE merely will see what appears to be an aborted four-bit message having no significance.

As the supervisory message ends and the trailing flag of this message enters the shift register X9, the switch 118 is reset to 1 so that the next byte of data which passes through the receiving interface 114 is routed through the conductor 116 and switch position 1 to the receiving DTE 124, as represented by the flowchart box 132, FIG. 6. In the event that the trailing flag of the supervisory message also had been serving as the leading flag of a following normal message, the flag which was generated by the register X12 and which passed through switch position 2 to the DTE just before the switch 118 returned to its position 1 now may serve as the leading flag of the normal message passing through switch position 1.

FIG. 7 shows exemplary logic circuitry for executing the functions depicted in the flowchart of FIG. 6. The delay line X9-X10-X11 consists of two eight-bit shift registers X9 and X11 linked by an intervening 4-bit shift register X10. AND gates 134 and 136 respectively furnish satisfaction signals when flags are present in registers X9 and X11. If flags are simultaneously present in registers X9 and X11, coincident enabling signals then are applied to an AND gate 138, which turns a flip-flop 140 on to indicate that a supervisory message header sequence FXXXXF has been detected in the incoming data stream.

Flip-flop 140 has a certain response time during which its output voltage is still zero while an input voltage is being applied to its D terminal by AND gate 138. This input voltage also is applied to an AND gate 142. The other input to gate 142 is supplied by flip-flop 140 through inverter 144. During the short response period of flip-flop 140, the AND gate 142 therefore receives coincident enabling inputs from gate 138 and inverter 144, causing AND gate 142 to emit a brief pulse to a register loading circuit 146, causing a flag bit pattern to be entered into the recirculating shift register X12 in a desired time relationship with the flag that is present in register X9 at this instant. The purpose of such an arrangement will be explained presently.

When flip-flop 140 turns on, it also applies enabling signals to a flip-flop 147 and an AND gate SW2 (corresponding to switch setting 2). Through an inverter 148, it applies a disabling signal to AND gate SW1, which corresponds to switch setting 1. When gate SW2 is enabled, it causes flags generated by the recirculating register X12 to be sent continuously through OR gate 150 to the DTE. Such flags take the place of any supervisory message bytes that otherwise would pass directly through conductor 116 and gate SW1 (now disabled) to the DTE. The supervisory message meanwhile is routed through delay line X9-X10-X11 to the supervisory equipment.

As flip-flop 147 is turned on, it furnishes to the supervisory equipment a signal that enables this equipment to receive the supervisory message train, which now is commencing to exit from shift register X11. Concurrently therewith, the flip-flop 140 supplies a disabling signal through an inverter 152 to gate 138, and through a shift register X13 it supplies an enabling signal to an AND gate 154. The shift register X13 delays application of this enabling signal to gate 154 for a limited time, permitting the present flag to be cleared out of register X9 before conditioning gate 154 to sense the arrival in register X9 of a subsequent flag at the trailing end of the supervisory message. Every received supervisory message, whether complete or truncated, will have a trailing flag. As this flag enters register X9, the coincident input signals at gate 154 enable this gate to pass a reset signal directly to flip-flop 140 and, through a shift register X14, to flip-flop 147. The reset delay afforded by register X14 will allow all of the supervisory message bits now standing in the delay line X9-X10-X11 to pass into the supervisory equipment before flip-flop 147 goes off and terminates the signal which had enabled the supervisory equipment to receive message data.

As flip-flop 140 goes off, it terminates the enabling signal to gate SW2, restores the enabling signal to gate SW1, removes the disabling signal from gate 138, and after a delay afforded by shift register X13, removes the enabling signal from gate 154. As gate SW2 is disabled and gate SW1 is enabled, received data bits now may pass through conductor 116 and gate SW1 directly to the DTE. In the event that the trailing flag of the terminated supervisory message also had been serving as the leading flag of a new normal message, the final flag that passed from the recirculating register X12 through gate SW2 before gate SW2 was disabled now serves as the leading flag of the normal message passing through gate SW1.

There has been described what is presently regarded as the best mode of carrying out the invention. It should be understood, however, that some changes and modifications may be made therein without departing from the spirit and purpose of the invention. For example, the supervisory message insertion apparatus shown in FIG. 2 could be operated with a two-position switch in lieu of the three-position switch as shown, eliminating what is designated as switch position 1 in FIG. 2 and requiring that all normal messages pass through the delay line X1-X2-X3. Switch setting 2 then would be considered the "normal" setting. This mode of operation would tend to increase the normal message transmission time if frequent changes of switch settings were made, but it also would simplify the design of the switch control circuitry and perhaps reduce its cost somewhat without impairing its ability to insert supervisory messages into the gaps between normal messages.

The term "switch" or "switch means" as employed herein, or the representation of an element as an electromechanically operated switch in the drawings, should be broadly construed to mean any appropriate circuit closing or opening device or a coupling means of any other type that is suited to perform the required function of establishing or interrupting a specific operative connection at the place in the circuitry where it is located. The "setting" or position of a switch is simply its current state, or more particularly, the present condition of the electrical circuitry which is specifically controlled by that switch. Different settings or positions of a given switch may refer to different circuit-controlling elements. For instance, the symbolic switch 16 in FIG. 2 has settings 1, 2 and 3 which actually correspond to the following elements shown in FIG. 4B:

| Switch Setting | Corresponding Circuit-Controlling Elements |
| --- | --- |
| 1 | AND gate SW1 and inverters 26 & 28 |
| 2 | Flip-flop SW2 and AND gate 98 |
| 3 | Flip-flop SW3 and AND gate 48 |

Having thus described my invention, what I claim as new, and desire to secure by Letters Patent is:

1. In a digital data communication system wherein a common channel is used for carrying messages generated by both a normal message generator and a supervisory message generator, message insertion apparatus for enabling supervisory messages to enter said channel during intervals when no significant messages are being produced by said normal message generator, said apparatus comprising:
   switch means having a normal setting for coupling the normal message generator to said channel, a supervisory setting for coupling the supervisory message generator to said channel; and said switch means also having an alternative setting in which it is effective to couple the normal message generator to said channel indirectly through said delay line,
   a digital delay line for registering the output data which has been produced by said normal message generator during a time interval of limited duration preceding the current time;
   message status means associated with said delay line for producing signals denoting whether or not a significant message currently is being produced by the normal message generator and the current status of such a message if there is one;
   first control means responsive to the concurrence of a request-to-send signal from the supervisory message generator and signals from said message status means denoting that no significant message currently is being produced by the normal message generator for causing said switch means to assume its supervisory setting; and
   second control means responsive to the occurrence of signals from supervisory message generator denoting the completion of a supervisory message while said switch means is in its supervisory setting for causing said switch means to assume its normal setting, and
   third control means responsive to signals from said message status means denoting that significant data currently is being produced by said normal message generator while said switch means is in its supervisory setting for changing the state of said switch means from its supervisory setting to said alternative setting thereof.

2. Apparatus as claimed in claim 1 further comprising fourth control means responsive to a termination of the request-to-send signal from said supervisory message generator before the supervisory message currently in progress is completed for changing the state of said switch means from its supervisory setting to said alternative setting thereof.

3. Apparatus as claimed in claim 1 or claim 2, further comprising fifth control means effective when said switch means is in its alternative setting and responsive to signals from said message status means denoting that a normal message has ended or that no portion of a normal message is present in said delay line while said switch means is in its alternative setting for changing the state of said switch means from its alternative setting to the normal setting thereof.

4. In a digital data communication system having a transmitter for sending messages from a normal message generator and a supervisory message generator through a common channel to one or more receiving locations, message insertion apparatus for enabling supervisory messages to be transmitted through said channel during intervals when no significant messages are being generated by the normal message generator, said message insertion apparatus comprising:
   normal gate means operable to pass message data from the normal message generator to said transmitter;
   supervisory gate means operable to pass message data from the supervisory message generator to said transmitter;
   a first digital delay line for registering the data which has been furnished by the normal message generator during a time interval of specified duration preceding the current time;
   first message status means associated with said first delay line for producing signals which denote whether or not a significant message currently is being produced by the normal message generator and the current status of such a message if there is one;
   a second digital delay line for registering the data which has been furnished by the supervisory message generator during a time interval of predetermined duration preceding the current time;
   second message status means associated with said second delay line for producing signals which denote whether or not a significant message currently is being produced by the supervisory message generator and the current status of such a message if there is one;
   first control means responsive to the concurrence of a request-to-send signal from the supervisory message generator and signals from said first message status means denoting that no significant message currently is being produced by the normal message generator for rendering said supervisory gate means operative; and second control means responsive to signals from said second message status means denoting the completion of a supervisory message while said supervisory gate means is operative for disabling said supervisory gate means and rendering said normal gate means operative, alternative gate means operable to provide an alternative path for message data from the normal message generator through said first delayline to said transmitter; and third control means responsive to signals from said first message status means denoting that significant data currently is being produced by said normal message generator while said supervisory gate is operative for disabling said supervisory gate means and rendering said alternative gate means operative.

5. Apparatus as claimed in claim 4 further comprising fourth control means responsive to a termination of the request-to-send signal from the supervisory message generator in the absence of a signal from the second message status means denoting completion of the current supervisory message for disabling said supervisory gate means and rendering said alternative gate means operative.

6. Apparatus as claimed in claim 5, further comprising fifth control means effective when said alternative gate means is operative and responsive to signals from said first message status means denoting that a normal message has ended or that no portion of a normal message is present in said first delay line for disabling said alternative gate means and rendering said normal gate means operative.

7. A digital data communication system as claimed in claim 4, further comprising message removal apparatus at a receiving location for routing supervisory messages passing through said channel to a supervisory message receiver separate from the receiver for normal messages passing through said channel, said message removal apparatus comprising:

normal coupling means for coupling the normal message receiver to said channel;

other coupling means for coupling the supervisory message receiver to said channel;

a shift register for registering the data which has been received from said channel during a time interval of limited duration preceding the current time;

message analyzing means associated with said shift register for producing signals denoting whether or not a supervisory message currently is being received from said channel and the current status of such a message if there is one;

means responsive to the occurrence of signals from said message analyzing means denoting the beginning of a supervisory message for disabling said normal coupling means and enabling said other coupling means; and means responsive to the occurrence of signals from said message analyzing means denoting the end of a supervisory message for enabling said normal coupling means and disabling said other coupling means.

8. In a digital data communication system wherein a common channel is used for carrying messages generated by both a normal message generator and a supervisory message generator, message insertion apparatus for enabling supervisory messages to enter said channel during intervals when no significant messages are being produced by said normal message generator, said apparatus comprising:

a digital delay line for registering the data produced by the normal message generator during a time interval of limited duration preceding the current time;

switch means having a normal setting for coupling the normal message generator directly to said channel, an alternative setting for coupling the normal message generator indirectly through said delay line to said channel, and a supervisory setting for coupling the supervisory message generator to said channel;

message status means associated with said delay line for producing signals denoting whether or not a significant message currently is being produced by the normal message generator and the current status of such a message if there is one;

first control means responsive to the concurrence of a request-to-send signal from the supervisory message generator and signals from said message status means denoting that no significant message currently is being produced by the normal message generator for causing said switch means to assume its supervisory setting;

second control means responsive to the presence of signals from the supervisory message generator denoting the completion of a supervisory message while said switch means is in its supervisory setting, in concurrence with signals from said message status means denoting that no significant message currently is being produced by the normal message generator, for causing the state of said switch means to change from its supervisory setting to its normal setting; and third control means responsive to signals from said message status means indicating the possibility that the normal message generator may be generating significant message data while said switch means is in its supervisory setting for causing the state of said switch means to change from its supervisory setting to its alternative setting.

9. Message insertion apparatus as claimed in claim 8 wherein:

said message status means includes means for producing a distinctive signal whenever a particular digital sequence that may mark the beginning of a normal message is detected at a predetermined position in said delay line; and said third control means includes means for timing the change of switch state from the supervisory setting to the alternative setting so that it coincides with the production of said distinctive signal.

10. Message insertion apparatus as claimed in claim 9, further comprising:

digital sequence loading means effective when said switch means changes from its supervisory setting to its alternative setting for causing a digital sequence identical with said particular digital sequence to be loaded into a portion of said delay line immediately preceding said predetermined position.

11. Message insertion apparatus as claimed in claim 10, further comprising fourth control means effective when said switch means is in its alternative setting and responsive to signals from said message status means denoting that a normal message has ended or that no portion of a normal message is present in said delay line while said switch means is in its alternative setting for changing the state of said switch means from its alternative setting to the normal setting thereof.

* * * * *